Nov. 13, 1962 L. E. BLANK 3,064,083

INTERCOMMUNICATION APPARATUS

Filed April 11, 1958 2 Sheets-Sheet 1

INVENTOR.
LAVERNE E. BLANK
BY
Mason, Kolehmainen, Rathburn and Wyss.
ATTORNEYS

Nov. 13, 1962 L. E. BLANK 3,064,083

INTERCOMMUNICATION APPARATUS

Filed April 11, 1958 2 Sheets-Sheet 2

United States Patent Office 3,064,083

Patented Nov. 13, 1962

3,064,083

INTERCOMMUNICATION APPARATUS

Laverne E. Blank, Racine, Wis., assignor to Webster Electric Company, Racine, Wis., a corporation of Delaware Filed Apr. 11, 1958, Ser. No. 728,007
24 Claims. (Cl. 179—38)

The present invention relates to intercommunication apparatus and more particularly to intercommunication apparatus of the loud-speaking type.

One of the primary objects of the present invention is to provide a new and improved intercommunication system of the loud-speaking type and an intercommunicating unit for use in such a system enabling different types of units readily to be combined in a system.

A further object of the present invention is to provide a new and improved intercommunication system comprising different types of units with new and improved arrangements for signaling between stations, controlling the operativeness of amplifiers included in the system and with new and improved station selector and amplifier control means.

Another object of the present invention is to provide a new and improved intercommunication system of the loud-speaking type and units for use therein so constructed and arranged that each unit may be readily and selectively operated as a private or non-private unit.

Figure 1:
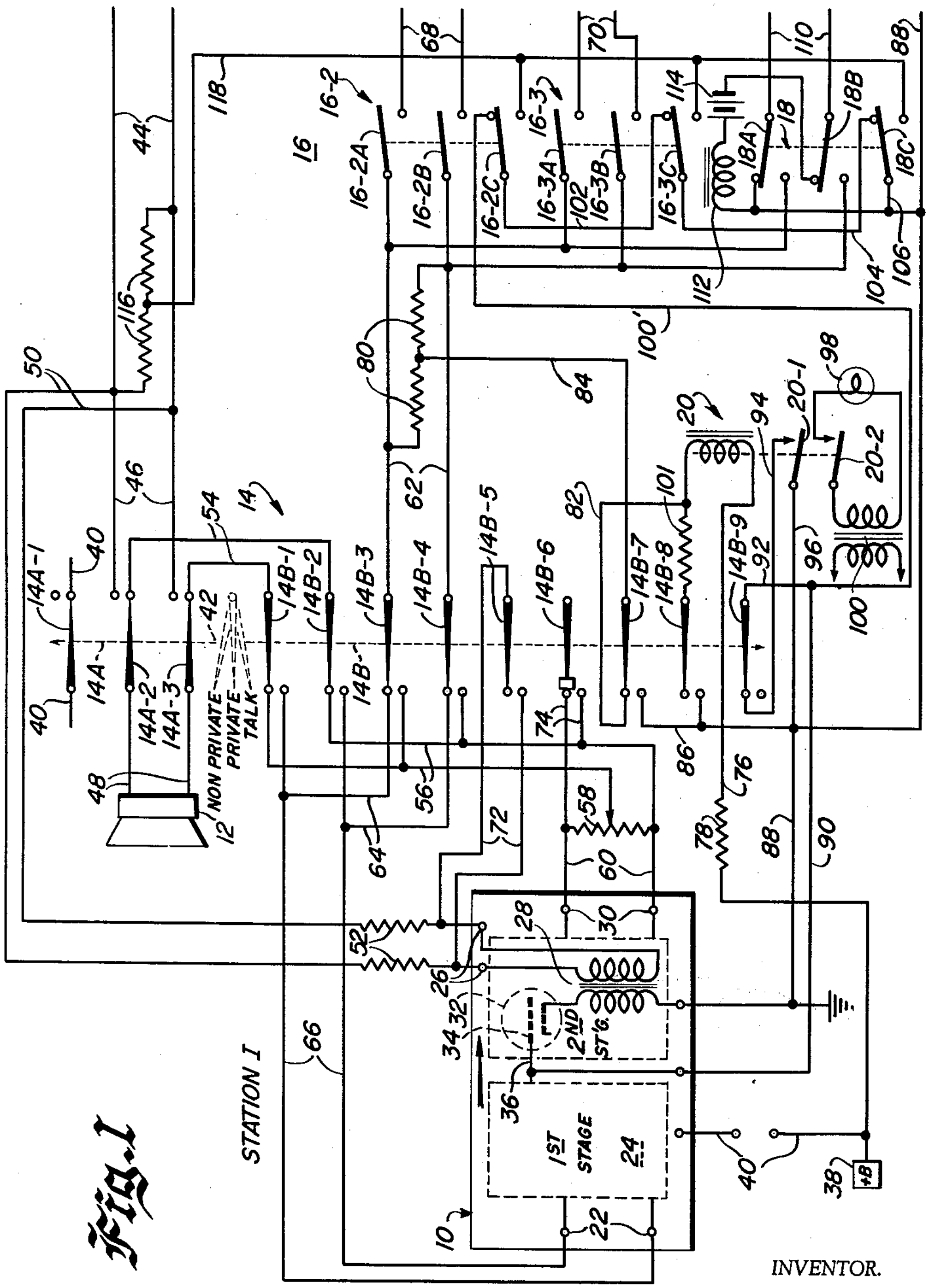
Figure 2:
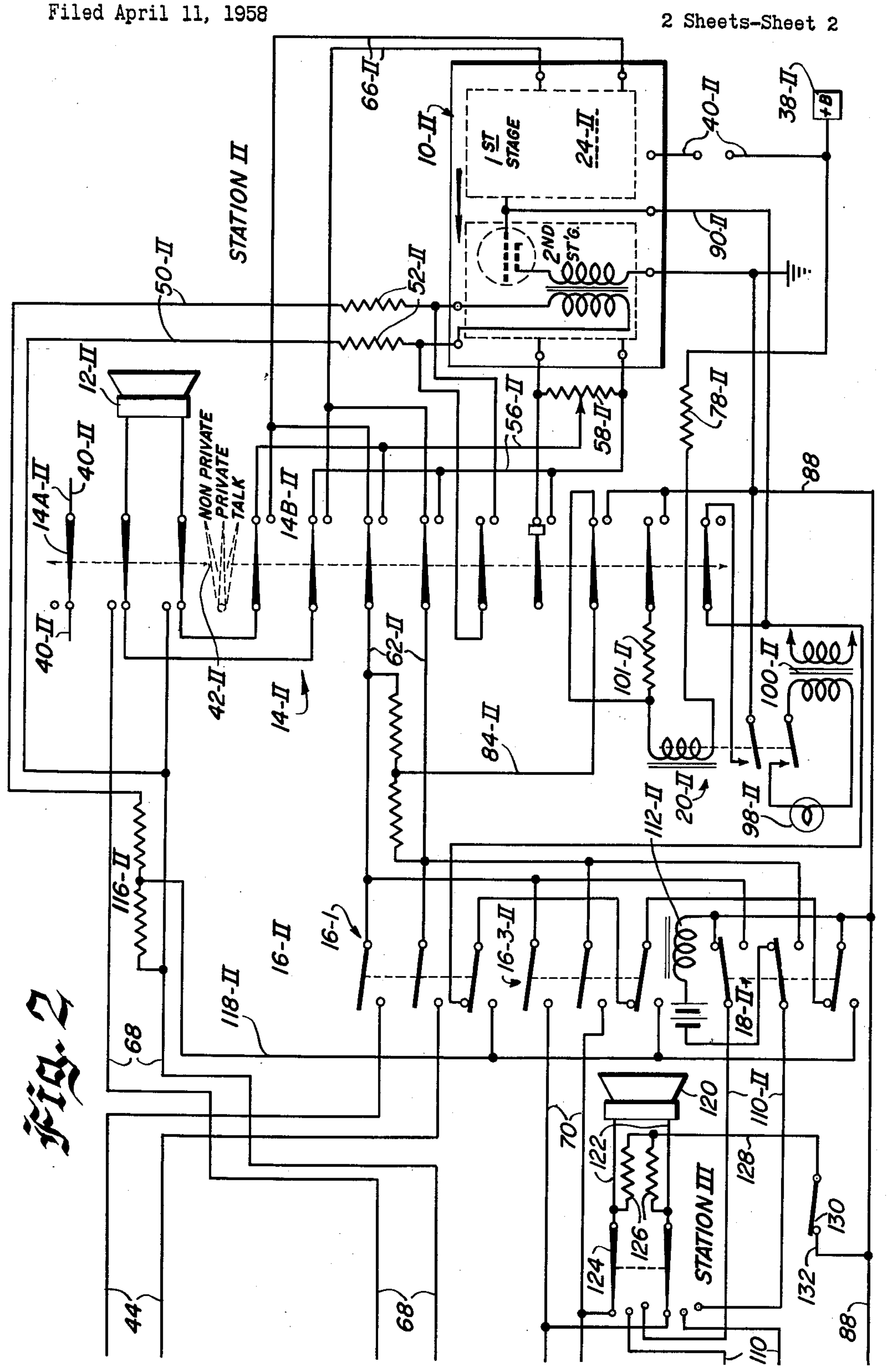

Other objects and advantages of the present invention will become apparent from the ensuing description of an illustrative embodiment thereof in the course of which reference is had to the accompanying drawings, in which:

FIG. 1 illustrates diagrammatically a first station provided with an intercommunication unit constructed in accordance with the present invention; and FIG. 2 illustrates a second station of the system with a unit corresponding to the first and including also a third station of a different type.

Referring now to the drawings, the intercommunication system illustrated is shown to include three stations, numbered I, II and III, of which Stations I and II are identical and each consists of an intercommunication unit constructed in accordance with the present invention. Station III is of a different but known type.

The apparatus at Station I include an amplifier 10, a transducer 12 utilized both as a loud-speaking receiver and transmitter, a multiposition communication control switch generally called a talk-listen switch and indicated generally by the reference character 14, a group of station selector switches 16, a call-in switch 18, and a busy signal and amplifier controlling relay 20.

The amplifier 10 may be in general of known construction but including first or main input terminals 22 leading to a first stage amplifier 24, a second or intermediate stage input terminal 26 leading to a second stage input transformer 28 and output terminals 30. The second stage is shown as including a tube 32 having an input grid 34, to which is connected an interstage lead 36, and a cathode in circuit with which is the input transformer 28. It should be noted though that a transistor type second stage could be used with the input transistor in either the base or emitter circuit. The amplifier may be supplied with B potential from any suitable source 38 through conductors 40 adapted to be coupled through talk-listen switch blade 14A–1 in the indicated position of the talk-listen switch.

The communication control switch 14 includes two sections 14A and 14B and is operable manually by an actuator 42 between the indicated middle position, termed a private (and listen) position, to an upper non-private (also a listen) position and a lower talk position. The details of the switch have not been illustrated other than diagrammatically but it may be of known type of construction. When the actuator 42 is moved to its upper position, only the upper switches 14A–1, 14A–2 and 14A–3 are actuated, they being moved from their indicated to their upper positions. During this movement the lower switch blades, which are nine in number and indicated by the reference characters 14B–1 to 14B–9, remain in their indicated positions. When the actuator 42 is moved to its lower and talk position, the switch blades 14A–1, 14A–2 and 14A–3 remain in their indicated positions whereas the lower switch blades 14B–1 to 14B–9 are moved downwardly into their displaced positions.

When the talk-listen switch is in its upper and non-private listen position, other stations may selection Station I to call it and they may listen to Station I. In the indicated private position, such listening cannot be effected. In the talk position, the station is conditioned for transmission to other stations.

When the talk-listen switch 14 is actuated to its upper non-private position, switch blades 14A–2 and 14A–3 are connected to an interstation line 44 and which constitutes the Station I home line, this connection being effected through the conductors 46, the switch blades 14A–2 and 14A–3, and conductors 48. At the same time, preferably, the amplifier is rendered inoperative by interruption of the B supply by switch blade 14A–1. Accordingly, other stations may select the Station I home line and may call it or listen to it, as will be explained in greater detail hereinafter when operation of the system will be described. The switch 14 is of a known type such that it remains in its upper and middle positions when actuated into them, but is spring returned from its lower talk position to its middle position.

The Station I home line 44 is connected also by the pair of conductors 50 to the intermediate stage amplifier input terminals 26 through resistors 52 which provide some attenuation of the signal supplied to this input and impedance matching. Thus, it will be noted that in the indicated position of the talk-listen switch, the home line 44 individual to Station I is effectively connected to the second stage amplifier input.

In the indicated private listen position of the talk-listen switch, the loud-speaker 12 is connected to the amplifier output terminals 30 through conductors 48, switch blades 14A–2 and 14A–3, conductors 54, switch blades 14B–1 and 14B–2, conductors 56, output volume control 58, and conductors 60. Thus, in the indicated private position of the talk-listen switch, various signals applied to the home line 44 individual to Station I are supplied to the second stage amplifier input, amplified by the second stage and then supplied to the loud-speaker 12. It should be noted that in this position of the talk-listen switch, the amplifier is supplied with B potential through the switch blade 14A–1 and conductors 40 and thus rendered operative for amplification by the second stage.

Station I is provided with the previously referred to station selector switches 16, of which there may be as many as desired or necessary in connection with the number of units in the stations. As shown, there are the individual station selector switches 16–2 and 16–3 which are provided for the selection of Stations II and III. The upper two contacts 16–2A,B and 16–3A,B of each switch are connected to the conductors 62 which are connected to the talk-listen switch blades 14B–3 and 14B–4. In the indicated position of the talk-listen switch these switch blades connect the conductors 62 to the amplifier input terminals 22 through the conductors 64 and 66. This connection does not complete any circuit as long as the selector switches are open but should a selector switch be closed, then, as will be described later herein, the line 62 and a selected home line, individual to another station, are connected to the amplifier input.

The selector switch 16–2 is adapted to close a circuit to line 68 which is the home line for Station II and the selector switch 16–3 is adapted to close a circuit to the conductor 70 which is a line leading to Station III. When the talk-listen switch 14 is operated to its down or talk position, the switch blades 14B–1 to 14B–2 are moved from their indicated to their down positions. One result of this operation is the reversal of the connections of line 62 and loud-speaker 12 from the main input and output, respectively, of the amplifier to the output and main input. The result of this is that the loud-speaker is connected to the input and the output of the amplifier is connected to line 62 for transmission to the station selected by a selector switch 16. In the talk position, the second stage input is shorted by the switch blade 14B–5, this shorting being effected through the conductors 72.

In operating switch 14 from the indicated private position to the talk position, the output of the amplifier is shorted temporarily by the switch blade 14B–6, the shorting being effected through the conductors 74. This shorting prevents transmission of switching noises and it should perhaps be noted further that the short circuit is effective only during movement of the switch from its private to its talk position and is not effective in the talk position.

The busy signal relay 20 has one terminal connected to B+ potential source 38 through conductor 76, resistor 78 and conductor 40. The other terminal is connected in the indicated private listen position to the midpoint of resistors 80 connected between the pair of conductors 62, this connection being made through conductor 82, switch blade 14B–7 and conductor 84. In the talk position of switch 14, the midpoint between resistors 80 is connected to ground through conductor 84, switch blade 14B–7 in its down position, and a conductor 86 which is connected to ground conductor 88. The circuit for the busy relay 20 is such that it is normally deenergized but is energized in the event of the selection of a busy station. At this time the relay is energized from its own B+ and through a ground connection at the busy station, which ground connection is made through the third blade of the other master station's selector switch 16 in its operated position, at which time it is connected to the ground conductor 88 at the other station.

In the event of the selection of a busy station with the talk-listen switch in its middle position and resultant energization of relay 20, the amplifier at the calling station, in this case Station I, has the output from its first stage amplifier grounded thereby preventing double amplification as well as listening to or eavesdropping upon a selected station. This grounding is effected through conductor 90, connected to the interstage connection 36, conductor 92, switch blade 14B–9 in its indicated position, conductor 94 and switch blade 20–1 of the relay in its up position and conductor 96.

Upon selection of a busy station, a busy signal light 98 is energized by the busy signal relay contact 20–2, which, in its up position, completes an energizing circuit for the light 98 through the secondary winding of a transformer 100.

When two stations are interconnected for communication, the busy signal relays 20 thereat are thus both energized. Consequently, the first stage amplifier output is shorted in the middle private listen position of the talk-listen switch. However, in the talk position, this shorting circuit is broken by opening of the circuit by switch blade 14B–9 in its down position. At the same time, i.e., in the talk position, the relay 20 is disconnected from line 62 by opening of the circuit 82—84 by switch blade 14B–7. In order to prevent relay 20 from being deenergized in this, the talk, position, it is held energized by a ground circuit through resistor 101 and switch blade 14B–8. This resistor has a value such as to limit current flow to a value to hold relay 20 in its operated position, but such as not to energize it sufficiently to move it there. Also, to maintain circuit 62 grounded in the talk position, the switch blade 14B–7 connects it to ground through conductors 84 and 86. Switch blades 14B–7 and 14B–8 are so adjusted that 14B–8 makes with ground before blade 14B–7 breaks from relay 20. This prevents the energized relay from becoming deenergized during operation of talk-listen switch.

The output of the first stage amplifier is also shorted when none of the station selector switches 16 is operated. This shorting circuit extends from the interstage conductor 36 through conductor 90, conductor 100' a third switch blade 16–2C of station selector switch 16–2, a jumper conductor 102, switch blade 16–3C of the switch 16–3, jumper conductor 104 and the switch blade 18–C of the call-in switch 18 which is connected to ground conductor 88 through conductor 106. Thus, the output of the first stage amplifier is grounded as long as none of the station selector switches are operated and the call-in switch 18 is in its indicated position ready to receive buzzer calls from stations such as Station III through the call-in line 110. As shown, the call-in line 110 is connected through it to the uppermost switch blades 18A and 18B of switch 18 to a buzzer 112 which is connected to a source of power indicated by battery 114. Accordingly, whenever a circuit across the conductors 110 is completed at another station, the buzzer is energized.

When any selector switch is operated to select a station, the first stage amplifier shorting circuit is broken and Station I home line 44 is connected to ground through the midpoint of resistors 116 connected across the line, conductor 118, the third switch blade C of the selector switch conductors 102 and 104 and switch blade 18–C. When the call-in switch 18 is operated, the shorting circuit is also broken and line 110 is connected to line 62 so communication can be carried on over line 110 as will be described later. In this position, home line 44 is grounded through the midpoint of resistors 116, conductor 118 and switch blade 18–C.

In order to prevent noises resulting from opening and closing the station selector switches, the C blades are arranged to open after the A and B blades are closed and to close before the A and B blades are opened. This arrangement results in the first stage amplifier output being shorted when the interstation line 68 is being connected to and disconnected from line 62.

The apparatus at Station II corresponds to that at Station I and, with few exceptions, the corresponding elements have been indicated by like reference numerals followed by the suffix –II. Among the exceptions are the station selector switch for Station I, which has been indicated by reference character 16–1; the previously noted Stations II and III interstation lines 68 and 70, and the ground conductor 88, used in signalling and not communication, which extends to all stations.

The apparatus at Station III includes a loud-speaker 120 connected by conductors 122 to a call-in switch 124 normally connecting the speaker to the line 70 individual to Station III. The switch 124 is operable to a first displaced position to connect the call-in line 110 to the line 122 whereby an energizing circuit is completed to the buzzer 112 at Station I. It is also operable to a second displaced position to call Station II through line 110–II.

At this point it should perhaps be mentioned that in the event other stations are added to the system, additional station selector switches 16 would be supplied for them by connections in the circuit following switch 16–2.

A brief general description of the operation of a system will now be given. It should be understood that while only a few stations have been illustrated, a system ordinarily will comprise many more. The system may include stations of the type of Stations I and II having individual home lines and station selector switches. The system may include also stations, such as Station III, which is commonly called a remote, slave, or speaker station, while Stations I and II are the type generally called master stations.

To begin with, it will be assumed that the system is idle and that the apparatus at Stations I and III are conditioned for operation with the various switches in their indicated position. Also to begin with, the apparatus at Station II will be considered to be conditioned for non-private listen operation by movement of its talk-listen switch 14–II to its uppermost position. In this position the amplifier 10–II is inoperative by reason of the fact that its B+ circuit is open and the loud-speaker 12–II is connected to the Station II home line 68.

Returning now to the apparatus at Station I, it will be remembered that in the indicated position of the talk-listen switch 14, Station I is conditioned for private listen operation. In this position of the talk-listen switch, the amplifier 10 is supplied with B potential through switch 14A-1 and is thus operative. Loud-speaker 12 is connected to the output of the amplifier, the low level input 22 of the amplifier is connected to the communication circuit 62, and the Station I home line 44 is connected to the high level input 26. The high level input 26 is unshorted, the amplifier output is unshorted, the busy relay 20 is connected to B+ but it is unenergized even though it is connected also to resistors 80 across line 62, this resulting from the fact that line 62 is open. Also, the first stage of amplifier 10 is not shorted by contact 20–1 of relay 20 although the output is shorted by the normally closed C series of contacts of the station selector switches and the call-in switch.

In the indicated private listen position the amplifier 10 is thus conditioned for amplifying signals received by it over its own home line 44. These signals are supplied to the high level input, amplified by the second stage amplifier, and supplied to the loud-speaker 12.

Reviewing the operation of the talk-listen switch somewhat further, when it is operated to the talk position, the loud-speaker 12 is connected to the low level input 22 and the amplifier output is connected to line 62. The high level input 26 is shorted through conductors 72 and in between the operation from listen to talk the amplifier output is short circuited briefly. The busy relay 20 is grounded through resistor 101 at its own station but as previously explained, this does not result in operation of relay 20 but does result in holding it operated if it had been previously energized and moved to its operated position. At the same time relay 20 is disconnected from line 62 but the line is reconnected to ground through conductor 86 and switch blade 14B–7 in its lower position.

In further review it will thus be noted that transmission from Station I to other stations is effected through both the first and second stages of the amplifier. Received signals are amplified in both stages if received over line 62 but amplified only through the second stage if received over the line 44 which is the Station I home line. The circuits are so arranged that as far as the signal produced at Station I is concerned, the output of loud-speaker 12 is substantially at the same level irrespective of whether it is amplified by the two stages or single stage of amplification.

Returning now to the assumption that the loud-speaker 12–II at Station II is connected to its home line 68, then the operator at Station I can call Station II by closing the selector switch 16–2. This does two things at Station I, the first being the breaking of the short circuit across the first stage amplifier which is done by movement of switch blade 16–2C from its upper to its lower position. This movement also has the effect of grounding line 44 for busy signal purposes. Also, Station II home line 68 is connected to the line 62. The operator at Station I now operates the talk-listen switch to its lowermost position so that loud-speaker 12 is connected to the amplifier input and the amplifier output is connected to line 62 which has just been connected to loud-speaker 12–II. Consequently, signals may be transmitted from Station I to Station II. Also, if it is desired to carry on non-private conversation, as determined by the operator at Station II, then all that the operator at Station II has to do is simply to talk into his transducer 12–II. The direction of communication is controlled by the operator at Station I who operates the talk-listen switch between its lower talk and its middle private listen position. In this mode of operation the line 44 is not used and the relay 20 is not operated. However, as a consequence of the grounding of line 44, any other master station trying to select Station I would have its busy relay 20 energized by virtue of the connection to ground through line 44 and conductor 118 and the 16–2 switch at Station I. Also, should any station select Station II, which is now connected to circuit 62, the selecting station would have its busy signal relay energized in the talk position of the switch 14 at Station I.

One consequence of the energization of the busy signal at a third station selecting Station I or II would be closure of the switch 20–1 thereat which would effectively ground the first stage and thus prevent double amplification as well as any possible listening or eavesdropping.

It will now be assumed that the apparatus at Station II is in its indicated position and Station I desires to call it. The station selector switch 16–2 would be operated as previously, whereby line 62 at Station I would be connected to line 68 of Station II. In the indicated position of switch 14–II at Station II, line 68 is connected to the high level input of the second stage amplifier. When the operator at Station I depresses the switch 14 to the talk position, the loud-speaker 12 at Station I is connected to the amplifier input and the amplifier output is connected to line 62 and thus through line 68 to the second stage amplifier input at Station II. In this mode of operation both amplifiers are used but the attenuation provided by the resistors 52–II at Station II and the gain of the second stage of amplifier 10 at Station II are such that the signal supplied to loud-speaker 12–II is much the same as when it is called through Station I using both stages of amplification at Station I.

In order to respond to the call from Station I, the operator at Station II, in accordance with the preferred method of communication, closes the selector switch 16–1 at Station II. When this is done the busy signal relays 20 at the two stations are grounded and energized and the busy signal lights 98 are lighted. The first stage outputs are shorted through the switches 20–1 but as heretofore noted, this short circuit is broken in the talk position of the talk-listen switch at the respective stations. After the necessary station selector switches have been operated, the communication is carried on alternately in the two directions between the two stations by alternate operation of the talk-listen switches from their indicated position, which is the private listen position, to the talk position. During the conversation the busy relays of both stations will remain energized during operation of talk-listen switches, due to reasons previously explained, until the conversation is completed and the selector switches are returned to the off position.

Any station, i.e., master station, selecting either Station I or II would have its busy signal relay 20 energized as a consequence of which the first stage amplifier output would be shorted and the busy signal lighted, to prevent eavesdropping and double amplification and to provide a busy signal.

A master station, such as Station I can call a remote station, such as Station III, upon operation of its selector switch 16–3. The master station, assuming this to be Station I, can call Station III but cannot listen to Station III at this time. The reason is that Station III home line 70 is grounded through the switch 130 so that in the listen position of switch 14 at Station I the busy signal relay 20 would be operated and thereby short circuit the first stage amplifier output and prevent reception of signals received from Station III over the line 62, which it may be remembered, is connected to the input of the first stage amplifier. In responding to the call, the operator at Station III simply opens switch 130 after which communication can be carried on between the stations under the control of the operator at Station I who operates switch 14 between its middle and down positions to listen and talk respectively. Any station selecting either Station I or III when they are connected for communication would have its busy signal relay 20 energized thereby to silence the high level input and light the busy light.

An operator at Station III can call a master station, for example Station I, by movement of its call-in switch 124 from its indicated position to line 110. This completes the circuit to the buzzer call-in 112 over the line 110 and through the switch blades 18A and 18B as previously described. To respond to the call the operator at Station I can do one of two things. He can close the Station III selector switch 16–3 or move the switch 18A to its lower position, which he must generally do in order to find out who is calling. Thereafter, communication can be carried on either over lines 70 or line 110. In either case, the Station I home line is grounded as is the line 62 as heretofore described.

While the present invention has been described in connection with the details of a preferred embodiment thereof, it should be understood that such details are not intended to be limitative of the invention except insofar as set forth in the accompanying claims.

What is claimed as new and is desired to be secured by Letters Patent of the United States is:

1. An intercommunication unit, including in combination, a transducer, an amplifier having a low level signal input, a high level signal input and an output, a first interstation line having a first branch connected to said high level input and a second branch, a second interstation line, and communication direction control switch means including two sections operable by a single actuator, a first of said sections being operable in one position to connect said second branch to the transducer and in a second position to connect said transducer to the other section of the switch, and said other section being adapted in a position corresponding to the second position of said first switch section to connect said transducer to the amplifier output, said second interstation circuit to the low level input and being operable in another position to connect said transducer to the amplifier low level input and the second interstation line to the amplifier output.

2. An intercommunication unit, including in combination, a transducer, an amplifier having a first stage with low level signal input, a second stage with high level signal input and an output, a first interstation line having a first branch connected to said high level input and a second branch, a second interstation line and communication direction control switch means including two sections operable by a single actuator, a first of said sections being operable in one position to connect said second branch to the transducer and to render the amplifier inoperative and in a second position to connect said transducer to the other section of the switch, and said other section being adapted in a position corresponding to the second position of said first switch section to connect said transducer to the amplifier output, said second interstation circuit to the low level input and being operable in another position to connect said transducer to the amplifier low level input and the second interstation line to the amplifier output, a two-position relay connected to a source of power at the unit, said second switch being adapted in one position to connect said relay to said second interstation line, and switch means operable by said relay for short circuiting the first stage output, and said second section of the communication control switch opening said short circuit in its said other position.

3. An intercommunication unit, including in combination, a transducer, an amplifier having a first stage with low level signal input, a second stage with high level signal input, and an output, a first interstation line having a first branch connected to said high level input and a second branch, a second interstation line and communication direction control switch means including two sections operable by a single actuator, a first of said sections being operable in one position to connect said second branch to the transducer and to render the amplifier inoperative and in a second position to connect said transducer to the other section of the switch, and said other section being adapted in a position corresponding to the second position of said first switch section to connect said transducer to the amplifier output, said second interstation circuit to the low level input and being operable in another position to connect said transducer to the amplifier low level input and the second interstation line to the amplifier output, a two-position relay connected to a source of power at the unit, said second switch section being adapted in one position to connect said relay to said second interstation line, switch means operable by said relay for short circuiting the first stage output, and said second section of the communication control switch opening said short circuit in its said other position, and station selector switches, said switches short circuiting said first stage output when all are in non-selecting position, and each grounding said first interstation line when in a station selecting position.

4. An intercommunication unit, including in combination, a transducer, an amplifier having a first stage with low level signal input, a second stage with high level signal input and an output, a first interstation line having a first branch connected to said high level input and a second branch, a second interstation line and communication direction control switch means including two sections operable by a single actuator, a first of said sections being operable in one position to connect said second branch to the transducer and to render the amplifier inoperative and in a second position to connect said transducer to the other section of the switch, and said other section being adapted in a position corresponding to the second position of said first switch section to connect said transducer to the amplifier output, said second interstation circuit to the low level input and being operable in another position to connect said transducer to the amplifier low level input and the second interstation line to the amplifier output, a two-position relay connected to a source of power at the unit, said second switch section being adapted in one position to connect said relay to said second interstation line, switch means operable by said relay for short circuiting the first stage output, and said second section of the communication control switch opening said short circuit in its said other position, station selector switches, and a call-in switch, said selector switches and call-in switch short circuiting said first stage output when the selector switches are in non-selecting position and the call-in switch in a first position, and each of said switches grounding said first interstation line when in a second position.

5. An intercommunication unit including an amplifier having a low level input and a high level input, a plurality of multiposition station selector switches, and means including an amplifier control circuit connected through and controlled by a plurality of said station selector switches for rendering said amplifier ineffective to pass signals supplied to said low level input when said selector switches are in non-selecting position.

6. An intercommunication unit including an amplifying means having a low level input and a first stage amplifier connected to it, a high level input and a second stage amplifier connected to it, a plurality of multiposition station selector switches, and means including an amplifier control circuit connected through and controlled by a plurality of said station selector switches for short circuiting the output of the first stage amplifier when said selector switches are in non-selecting position.

7. An intercommunication unit including a first stage amplifier, a second stage amplifier coupled to the first, a plurality of multiposition station selector switches, and means including an amplifier control circuit connected through and controlled by a plurality of said station selector switches for short circuiting the output of the first stage amplifier when said selector switches are in non-selecting position.

8. An intercommunication unit as claimed in claim 7, wherein each amplifier stage has an input individual thereto.

9. An intercommunication unit as claimed in claim 8, wherein a first interstation line is connected to the input to the second stage amplifier, and wherein another interstation line is adapted selectively to be connected to first stage input and the output of the second stage amplifier.

10. An intercommunication unit including a first stage amplifier, a second stage amplifier coupled to the first, a plurality of station selector switches, means including a circuit connected through and controlled by a plurality of said station selector switches for short circuiting the output of the first stage amplifier when the switches are not operated, and means including a relay operable upon selection of a busy station through a selector switch for short circuiting the output of said first stage amplifier.

11. An intercommunication unit including a first stage amplifier, a second stage amplifier coupled to the first, a plurality of station selector switches, means including a circuit connected through and controlled by a plurality of said station selector switches for short circuiting the output of the first stage amplifier when the switches are not operated, means including a relay operable upon selection of a busy station through a selector switch for short circuiting the output of said first stage amplifier, and a plural position communication control switch operable in one position to open said short circuit.

12. An intercommunication unit including an amplifying means having a low level input and a high level input, a plurality of station selector switches, a multiposition call-in switch, and means including an amplifier control circuit connected through and controlled by the call-in switch in one of its positions for rendering said amplifying means ineffective to pass signals supplied to said low level input when said selector switches are in non-selecting position.

13. An intercommunication unit including an amplifying means having a low level input and a high level input, a plurality of multiposition station selector switches, a multiposition call-in switch and means including a circuit connected through and controlled by a plurality of said station selector switches and call-in switch for rendering said amplifying means ineffective to pass signals supplied to said low level input when said selector switches are in non-selecting position.

14. An intercommunication unit including an amplifier having a low level input and a high level input, and means including an amplifier controlling relay operable upon selection of a busy station to render said amplifier ineffective to pass signals supplied to said low level input.

15. An intercommunication unit including an amplifier having first and second stages of amplification with inputs individual thereto and having outputs, and means including an amplifier controlling relay operable upon selection of a busy station to short circuit the output of the first stage.

16. An intercommunication unit including an amplifier having a low level input and a high level input, means including an amplifier controlling relay operable upon selection of a busy station to render said amplifier ineffective to pass signals supplied to said low level input, and an amplifier controlling communication control switch operable in one position to render said amplifier effective to pass signals.

17. An intercommunication unit including an amplifier having a low level input and a high level input, means including an amplifier controlling relay operable upon selection of a busy station to render said amplifier ineffective to pass signals supplied to said low level input, and an amplifier controlling communication control switch operable in one position to render said amplifier effective to pass signals and to short circuit the high level input.

18. An intercommunication system, including in combination, a plurality of units each having multistage amplifying means with first and succeeding stage inputs to different stages, a transducer, a home line individual to each station connected to succeeding stage input, a communication line and station selector switches for connecting said line to the home lines of other stations, and means including a multiposition communication control switch and circuits controlled thereby for connecting the transducer to the home line in one position; said means also connecting the communication line to the input of the first amplifier stage and the transducer to the output of said amplifying means in another position; and said means also connecting the transducer to the input of the first stage, the output to the communication line and short circuiting the succeeding stage input in a third position.

19. An intercommunication system, including in combination, a plurality of units each having multistage amplifying means with first and succeeding stage inputs to different stages, a transducer, a home line individual to each station connected to succeeding stage input, a communication line and station selector switches for connecting said line to the home lines of other stations, means including a multiposition communication control switch and circuits controlled thereby for connecting the transducer to the home line in one position; said means also connecting the communication line to the input of the first amplifier stage and the transducer to the output of said amplifying means in another position; and said means also connecting the transducer to the input of the first stage, the output to the communication line and short circuiting the succeeding stage input in a third position, and means including station selector switches operable, when all are in non-selecting position, for short circuiting the output of the first stage.

20. An intercommunication system, including in combination, a plurality of units each having multistage amplifying means with first and succeeding stage inputs to different stages, a transducer, a home line individual to each station connected to succeeding stage input, a communication line and station selector switches for connecting said line to the home lines of other stations, means including a multiposition communication control switch and circuits controlled thereby for connecting the transducer to the home line in one position; said means also connecting the communication line to the input of the first amplifier stage and the transducer to the output of said amplifying means in another position; and said means also connecting the transducer to the input of the first stage, the output to the communication line and short circuiting the succeeding stage input in a third position, and busy signal relay means operable in the said second position to short circuit the output of the first stage upon selection of a busy station.

21. An intercommunication unit, including in combination, an amplifier, means including a busy relay for controlling operation of said amplifier, a ground circuit, an interstation line, and means including a multiposition communication direction controlling switch having a plurality of switch blades for controlling the connections of said relay to said line and ground circuit, one of said switch blades being operable in one position of said communication direction controlling switch to connect said relay to said interstation line and in another position to disconnect said relay from said line, and another of said switch blades being operable in said another position of said communication direction controlling switch to connect said relay to said ground circuit, said switch blades being so arranged that said ground connection is effected before said relay is disconnected from said interstation line.

22. An intercommunication unit as claimed in claim 21 wherein said ground connection includes a current limiting resistor limiting current flow to said relay to a value sufficient to hold the relay in operated position when energized but insufficient to operate it.

23. An intercommunication unit including a first stage amplifier, a second stage amplifier coupled to the first, a pair of lines, a plurality of multiposition station selector switches operable to interconnect said lines, means including a circuit connected through and controlled by a plurality of said station selector switches for short circuiting the output of the first stage amplifier when the switches are not operated and for opening the short circuit when the switches are operated, said selector switches being so constructed and arranged that the shorting circuit is opened after the interconnection of said lines and completed before said interconnection is broken.

24. An intercommunication unit including an amplifier, a pair of lines, a plurality of multiposition station selector switches operable to interconnect said lines, means including a circuit connected through and controlled by said station selector switch for rendering said amplifier ineffective when the switches are not operated and for rendering said amplifier effective when the switches are operated, said selector switches being so constructed and arranged that said circuit is opened after the interconnection of said lines and completed before said interconnection is broken.

References Cited in the file of this patent

UNITED STATES PATENTS

| | | |
|---|---|---|
| 2,566,106 | Agnew | Aug. 28, 1951 |
| 2,629,022 | Wall | Feb. 17, 1953 |
| 2,783,308 | Campbell | Feb. 26, 1957 |
| 2,819,340 | Brody | Jan. 7, 1958 |